Figure 1:
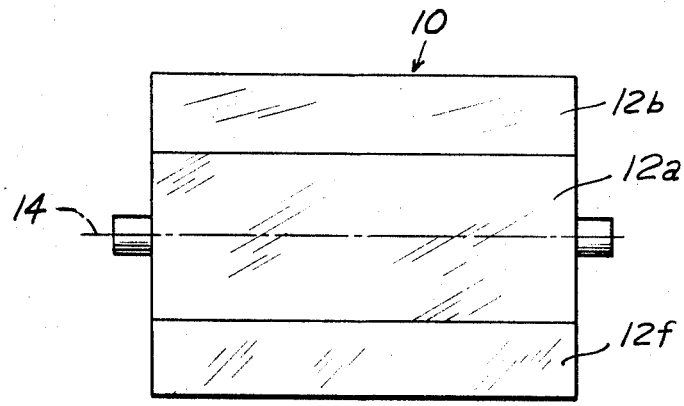

United States Patent

[11] 3,607,457

| [72] | Inventors | Bengt Olov Hagg;<br>Tore Bertil Reinhold Olsson, both of<br>Karlskoga, Sweden |
|---|---|---|
| [21] | Appl. No. | 831,820 |
| [22] | Filed | May 29, 1969<br>Division of Ser. No. 693,003, Dec. 22, 1967 |
| [45] | Patented | Sept. 21, 1971 |
| [73] | Assignee | Aktiebolaget Bofors<br>Bofors, Sweden |

[54] METHOD OF MANUFACTURING A ROTARY SCANNING PRISM
11 Claims, 2 Drawing Figs.

[52] U.S. Cl. .................................................. 148/12.1,
29/527.4, 117/35, 117/50, 148/12.3
[51] Int. Cl. ....................................................... C21d 9/00,
C23f 17/00

[50] Field of Search ............................................. 117/50, 35;
148/12.3; 29/527.4; 148/12.1

[56] References Cited
UNITED STATES PATENTS

| 2,585,128 | 2/1952 | Howe et al. ................... | 117/50 |
| 3,202,530 | 8/1965 | Wolfe et al. .................. | 117/50 |

*Primary Examiner*—L. Dewayne Rutledge
*Assistant Examiner*—W. W. Stallard
*Attorney*—Hane & Baxley

ABSTRACT: A method of producing a light-reflecting prism such as a mirror prism of equilateral polygonal cross section for image scanning by high speed rotation of the prism about its center axis by tempering and aging a steel blank. The blank is then machined to size and the sidewalls of the steel block thus obtained are coated with a highly light-reflecting metal such as gold.

PATENTED SEP 21 1971 3,607,457

INVENTORS
BENGT OLAV HÄGG
TORE BERTIL REINHOLD OLSSON
BY
Hane and Baxley
ATTORNEYS

METHOD OF MANUFACTURING A ROTARY SCANNING PRISM

The present application is a divisional application divided out of our copending application Ser. No. 693,003 filed Dec. 22, 1967.

The present invention relates to a method of manufacturing a prism such as a mirror prism of preferably equilaterally polygonal configuration and more particularly, to a method of manufacturing a prism of this kind for image scanning by high speed rotation.

BACKGROUND

It is known in connection with television equipment to use mirror prisms for image scanning along one dimension, usually for line scanning. Since the advent of television cameras operating in accordance with the image-storage system, the need for such mirror prisms has become greatly increased. In more recent times, television cameras have been designed for operation within the infrared radiation range, for instance, within the range of 2 to 5.5 $\mu$. For television cameras operating within this wave length it is necessary to use mirrors or similar light-deflecting optical means for scanning an image. Usually, one means for instance a light-deflecting mirror, is used for vertical scanning-image division and a rotary mirror prism for horizontal scanning-line division.

It is known to use as a rotary mirror prism a prism composed of several plane mirrors such as glass mirrors which are suitably mounted on a shaft or other rotary support. A mechanically composed rotary prism of this kind has many disadvantages, both as to its optical characteristics and its mechanical reliability. In particular, it has been found mechanically difficult to mount the several plane mirrors so that they accurately form a polygonal shape of predetermined dimensions. Moreover, it is also difficult to mount the mirrors so that they accurately retain their spatial positions when subjected to the stresses of high speed rotation. The last-mentioned mounting problem entails the danger of injury to persons close to the spinning mirror prism which is often unavoidable. Obviously, when the mirror prism should disintegrate a flying-off part of the mirror prism may cause serious injury to a bystander.

It is an object of the invention to provide a novel and improved method of producing a one-piece prism which when rotated at high image scanning speed retains its original shape with a practically fully satisfactory accuracy.

Other and further objects, features and advantages will be pointed out hereinafter and set forth in the appended claims constituting part of the application.

DESCRIPTION OF THE METHOD

In the accompanying drawing an embodiment of the invention obtained by carrying out the method of the invention is shown by way of illustration and not by way of limitation.

Figure 2:
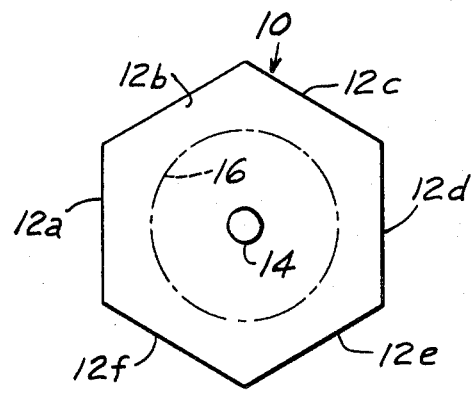

In the drawing:

FIG. 1 is a side view of a prism obtained with the method according to the invention; and FIG. 2 is an end view of FIG. 1.

Referring now to the figures more in detail, the exemplified mirror prism 10 is formed by a one-piece block of polygonal cross section such as an equilateral hexagon, the six facets of which are designated by 12a to 12f. The prism should be visualized as being rotatable about a center axis 14 which may be in the form of a shaft upon which the prism block is fixedly seated or trunnions may be suitably secured to opposite sides of the prism. The rotational speed to which the scanning prism may be subjected is in the order of 5,000 r.p.m.

The prism is made of a steel blank which is roughly shaped to size by a suitable operation such as drop forging. The blank is then hardened or tempered and aged and finally ground and lapped to produce a steel block which has the desired final dimensions and the facets 12a to 12f of which are sufficiently plane and polished to be acceptable for optical functions.

The steel block may be solid throughout, or it may have one or several suitable balanced bores such as the center bore indicated at 16 in FIG. 2 to reduce the weight of the block and also to facilitate hardening or tempering and aging of the same.

There are known and available many grades of steel which have the desired characteristics, that is, steels which can be easily worked, can be hardened or tempered without cracking or distortion and can also be aged so that the steel block maintains the dimensions to which it has been machined for a long period of time. Among the steels known for the purpose, a steel designated Bofors SR1855, and available in the market, is highly suitable.

Referring now more in detail to the method of producing the finished prism block, a blank is first formed by forging or rolling and annealing a billet, and if necessary also by a cutting and/or milling operation, particularly at the facets 12a to 12f. The blank is then, if desired, subjected to a stress-relieving operation, for instance by heating it to a temperature between 500° C. and 600° C., preferably to a temperature of 550° C.

If the block has a central bore such as is indicated at 16 or other bores, the internal walls of defining such bores are finished, for instance, by drilling or lathe turning.

The blank is now hardened or tempered. Such hardening can be effected when Bofors steel SR1855 or a similar grade of steel is used by heating the blank to a temperature within the range of 800° C. to 900° C., preferably 850° C., thereupon cooling the block for about 2 to 5 minutes in a sodium chloride bath having a concentration between 6 to 12 percent, preferably 8 percent and a temperature of 200° C, to 250° C., preferably 225° C. and by finally air-cooling the blank down to about 100° C. either by simply exposing it to the air or placing it in a forced airflow. After cooling the blank is tempered to a harness between HRC 46 and HRC 49 by heating the block to a temperature between 500° C. and 600° C. when the aforereferred to grade of steel is used.

As is evident, the foregoing values of temperature and treatment time must be modified in accordance with the specific characteristics of the grade of steel which is used. The stated values are to be considered only as guides for selecting the specific values required to give the grade of steel which is used, the desired characteristics needed to assure that the finished steel block accurately maintains its dimensions for a prolonged period of time.

The blank is now machined by suitable and conventional cutting, milling and similar operations until a block is obtained which has the desired dimensions.

The block is now subjected to an aging process which further serves to assure that the block maintains sufficiently constant the dimensions to which it has been machined. Aging is advantageously effected by subjecting the block to a heat treatment at comparatively low temperatures for a prolonged period of time. It has been found that heating a block made of the aforelisted Bofors steel to a temperature of about 170° C. to 200° C., preferably 180° C. for about 100 hours results in a satisfactory aging of the steel. Again, it should be mentioned that for other grades of steel the temperatures and the period of heating must be appropriately adjusted.

After the completion of the aging process which usually does not materially affect the dimensions of the block which the block had prior to being subjected to the aging process, the steel block and particularly the facets thereof, are finished if necessary preferably by lapping until the planeness and smoothness of the side wall facets of the block are sufficient for the optical use for which the prism when finished is intended.

The manufacture of the prism block is now completed with respect to mechanical working. The finished block is preferably subjected to a careful testing by conventional techniques for cracks and other flaws, for instance by using magnetic powder, and is finally carefully cleaned by means suitable and conventional for the purpose. After cleaning the block is ready for applying a reflecting coating to its facets 12a to 12f.

Suitable material for the reflecting coating which is preferably a very thin one, is generally a metal selected on the basis of the specific field of use for which the prism is intended and the operational conditions to which it is to be subjected.

Aluminum and silver are often suitable for the purpose. However, if there is a danger of corrosion, the presence of which results in a marked reduction of the light-reflecting factor of the coating, it is preferable to use a precious metal such as rhodium or another member of the platinum group, or gold.

For a mirror prism to be used within the range of infrared wave length, the metal coating should be selected so that it has a high light-reflecting capability within this range.

Gold has been found to be the most suitable coating material for all purposes and under all conditions.

The light-reflecting coating may be applied to the prism block by any of the various known methods, provided only that the used method assures that the coating material will strongly and uniformly adhere to the supporting steel surface. Among the known and suitable methods may be mentioned cathode atomization and precipitation from an electrolytic bath.

If gold is used as the coating metal, the precipitation method is generally advantageous and various suitable gold salts are readily available. Precipitation of gold from an electrolytic bath has the advantage that a very uniform covering can be safely and readily obtained even at the corners or edges of the facets.

More specifically, when aluminum is used as reflecting metal and the coating is applied by cathode atomization a coating having a thickness of less than 1 $\mu$ may be used. Tests have shown that a coating as thin as 0.1 $\mu$ will give satisfactory results. A gold coating can be conveniently and successfully produced by precipitation according to the electroplating process of U.S. Pat. No. 2,799,633. The precipitation is continued until a gold coating having a dimension of 0.1 to 1 $\mu$ is formed.

The metal coating produced as previously described is preferably subjected to a high gloss polishing operation by any of the techniques known for the purpose.

When gold is used, it is generally not necessary to apply a protective coating subsequent to polishing and drying the gold coating. However, if metal such as aluminum is used it tends to be affected by the air and a protective coating may be advisable.

When the prism is to be used for scanning within the range of the infrared wave length practically any protective coating tends markedly to decrease the reflecting capability of the coating. Hence, gold not needing a protective coating is the most practical coating material for prisms to be used within this range.

A mirror prism made in accordance with the present invention has been found to satisfy even very severe demands made in practice and it has produced particularly good results as to its optical characteristics.

What is claimed is:

1. A method of producing a light-reflecting prism rotatable for high speed image scanning, said method comprising the steps of:
    shaping a steel blank into a preshaped block of cross-sectionally substantially equilateral polygonal outline;
    tempering and aging the preshaped block, machining the block to a predetermined final shape having planed peripheral facets and being balanced for high speed rotation about its center axis; and
    applying a metal coating having a highly light-reflecting capability to the facets of said finally shaped block.

2. The method according to claim 1 and comprising the steps of hardening the steel block by heating the same to a predetermined temperature, placing the heated block in a sodium chloride bath until the block is cooled to a predetermined temperature range, than further cooling the block in air to a lower predetermined temperature, and then reheating the steel block until it reaches a predetermined elevated temperature effecting tempering of the block.

3. The method according to claim 2 wherein the steel block is heated to a temperature between 800° C. and 900° C., then cooled for 2 to 5 minutes by submersion in a sodium chloride bath having a temperature between 200° C.–250° C., then air cooling the steel block to a temperature between 90° C. and 110° C., and reheating the steel block until it reaches a tempering temperature between 500° C. to 600° C.

4. The method according to claim 3 wherein the steel block is heated to about 850° C., then cooled in the sodium chloride bath to about 225° C., then cooled in air to about 100° C. and then reheated to about 500° C.

5. The method according to claim 1 and comprising the step of aging the preshaped steel block by heating the same to a temperature between 170° C. and 190° C. and maintaining the steel block at said temperature for 90 to 110 hours.

6. The method according to claim 5 wherein the steel block is heated to a temperature of about 180° C. and maintained at said temperature for about 100 hours.

7. The method according to claim 5 wherein subsequent to aging said steel block is machined by lapping to its final shape.

8. The method according to claim 1 wherein the metal coating is applied to the facets of the steel block by a cathode atomization process.

9. The step according to claim 1 wherein the metal coating is applied to the facets of the steel block by precipitation in an electrolytic bath.

10. The method according to claim 9 wherein the metal coating is applied to the facets of the steel block in an electrolytic bath containing gold salts thereby producing a gold coating.

11. The method according to claim 10 wherein said bath is a potassium gold cyanide bath.